(12) United States Patent
Engelfried et al.

(10) Patent No.: US 9,789,627 B2
(45) Date of Patent: Oct. 17, 2017

(54) POWER CUTTING TOOL HAVING A GUARD UNIT

(71) Applicant: Robert Bosch GmbH, Stuttgart (DE)

(72) Inventors: Uwe Engelfried, Ostfildern (DE); Petr Grulich, Kirchheim/Teck (DE)

(73) Assignee: Robert Bosch GmbH, Stuttgart, DE (US)

( * ) Notice: Subject to any disclaimer, the term of this patent is extended or adjusted under 35 U.S.C. 154(b) by 136 days.

(21) Appl. No.: 14/410,076

(22) PCT Filed: May 2, 2013

(86) PCT No.: PCT/EP2013/059080
§ 371 (c)(1),
(2) Date: Dec. 20, 2014

(87) PCT Pub. No.: WO2014/000923
PCT Pub. Date: Jan. 3, 2014

(65) Prior Publication Data
US 2015/0321381 A1    Nov. 12, 2015

(30) Foreign Application Priority Data
Jun. 28, 2012   (DE) .................. 10 2012 211 091

(51) Int. Cl.
*B27G 19/00* (2006.01)
*B23D 57/02* (2006.01)

(52) U.S. Cl.
CPC ......... *B27G 19/003* (2013.01); *B23D 57/023* (2013.01)

(58) Field of Classification Search
CPC ..................... B27G 19/003; B23D 57/023
See application file for complete search history.

(56) References Cited

U.S. PATENT DOCUMENTS 2,638,944 A * 5/1953 Woleslagle ........ B23Q 11/0825
144/251.1
2,649,871 A   8/1953 Desbarat
(Continued)

FOREIGN PATENT DOCUMENTS

CN   201076950 Y   6/2008
DE   32 29 808 A1  2/1984
(Continued)

OTHER PUBLICATIONS

International Search Report corresponding to PCT Application No. PCT/EP2013/059080, dated Aug. 27, 2013 (German and English language document) (14 pages).

*Primary Examiner* — Hwei C Payer
(74) *Attorney, Agent, or Firm* — Maginot, Moore & Beck LLP (57) ABSTRACT

A power cutting tool includes at least one cutting strand and at least one guide unit configured to guide the cutting strand. The power cutting tool further includes at least one cutting strand contact guard unit which has at least one cutting strand contact guard element. The at least one cutting strand contact guard element is movably mounted on the guide unit and is configured to at least substantially prevent, in at least one operating position of the cutting strand contact guard element, contact between the cutting strand and a user of the power cutting tool.

9 Claims, 4 Drawing Sheets

(56) References Cited

U.S. PATENT DOCUMENTS

| | | | | |
|---|---|---|---|---|
| 2,937,673 | A | * | 5/1960 | Duperron ............. B27G 19/003 30/161 |
| 3,059,673 | A | | 10/1962 | Woleslagle |
| 3,230,987 | A | * | 1/1966 | Woleslagle .......... B27G 19/003 30/161 |
| 3,344,818 | A | | 10/1967 | Musgrove |
| 3,754,328 | A | | 8/1973 | Knerr |
| 3,808,684 | A | * | 5/1974 | Ludwig .................... A01G 3/08 30/371 |
| 4,063,358 | A | | 12/1977 | Hodge |
| 4,257,162 | A | | 3/1981 | Pardon |
| 4,382,334 | A | | 5/1983 | Reynolds |
| 4,621,426 | A | * | 11/1986 | Shivers ................ B27G 19/003 30/382 |
| 4,833,781 | A | * | 5/1989 | Allen .................. B27B 17/0083 30/377 |
| 5,179,785 | A | | 1/1993 | Nagashima |
| 5,269,064 | A | * | 12/1993 | Greene ................ B27G 19/003 30/371 |
| 5,413,158 | A | * | 5/1995 | Wirth, Jr. ........... B23D 57/0076 144/35.2 |
| 5,435,065 | A | * | 7/1995 | Raczykowski ..... B27B 17/0083 30/382 |
| 7,140,114 | B2 | * | 11/2006 | Shenker ............... B27G 19/003 30/371 |
| 2001/0025423 | A1 | | 10/2001 | Paquin |
| 2015/0321381 | A1 | * | 11/2015 | Engelfried .......... B23D 57/023 30/382 |

FOREIGN PATENT DOCUMENTS

| | | |
|---|---|---|
| DE | 10 2004 032 973 A1 | 2/2006 |
| DE | 10 2011 005 007 A1 | 9/2012 |
| EP | 0 062 188 A2 | 10/1982 |
| EP | 1 498 023 A2 | 1/2005 |
| EP | 2 036 688 A2 | 3/2009 |
| GB | 685 669 | 1/1953 |

* cited by examiner

POWER CUTTING TOOL HAVING A GUARD UNIT

This application is a 35 U.S.C. §371 National Stage Application of PCT/EP2013/059080, filed on May 2, 2013, which claims the benefit of priority to Serial No. DE 10 2012 211 091.7, filed on Jun. 28, 2012 in Germany, the disclosures of which are incorporated herein by reference in their entirety.

BACKGROUND

Power cutting tools which have a cutting strand and a guide unit for guiding the cutting strand are already known.

SUMMARY

The disclosure is based on a power cutting tool, in particular a hand-operated power cutting tool, having at least one cutting strand and having at least one guide unit for guiding the cutting strand.

It is proposed that the power cutting tool has at least one cutting strand contact guard unit, which has at least one cutting strand contact guard element that is movably mounted on the guide unit and that is designed to at least substantially prevent, in at least one operating state, accidental contact with the cutting strand. By a "cutting strand" should here be understood, in particular, a unit which is designed to locally demolish an atomic coherence of a workpiece to be machined, in particular by means of a mechanical separation and or by means of a mechanical removal of material particles of the workpiece. Preferably, the cutting strand is designed to separate the workpiece into at least two physically separate parts and/or, at least in part, to cut off and/or remove material particles of the workpiece, starting from a surface of the workpiece. Particularly preferably, the cutting strand, in at least one operating state, is moved rotatingly, in particular along a peripheral direction of a guide unit of the power cutting tool. Particularly preferably, the cutting strand is configured as a cutting chain. It is also conceivable, however, for the cutting strand to have a different design which appears sensible to a person skilled in the art, such as, for instance, a design as a cutting band, on which a plurality of cutting strand segments of the cutting strand are disposed. Preferably, the cutting strand, viewed along a direction running at least substantially perpendicular to a cutting plane of the cutting strand, has a maximum dimension less than 4 mm. Preferably, the dimension is configured as the width of the cutting strand. Particularly preferably, the cutting strand, viewed along the direction running at least substantially perpendicular to the cutting plane of the cutting strand, has an at least substantially constant maximum dimension along a total length of the cutting strand. Along the total length of the cutting strand, the maximum dimension preferably corresponds to a value within the range from 1 mm to 3 mm. Consequently, the power cutting tool, viewed along a total extent of the power cutting tool, has a total width which is less than 4 mm. Thus the cutting strand is preferably designed to produce a cutting clearance, which, viewed along the direction running at least substantially perpendicular to the cutting plane of the cutting strand, has a maximum dimension less than 4 mm. The expression "substantially perpendicular" is here intended to define, in particular, an orientation of a direction relative to a reference direction, wherein the direction and the reference direction, viewed, in particular, in a plane, enclose an angle of 90°, and the angle has a maximum deviation of, in particular, less than 8°, advantageously less than 5°, and particularly advantageously less than 2°.

By a "guide unit" should here be understood, in particular, a unit which is designed to apply a constraining force to the cutting strand, at least along a direction perpendicular to a cutting direction of the cutting strand, in order to define a freedom of movement of the cutting strand along the cutting direction. Preferably, the guide unit has at least one guide element, in particular a guide groove, by which the cutting strand is guided. Preferably, the cutting strand, viewed in the cutting plane, is guided along a total periphery of the guide unit by the guide unit by means of the guide element, in particular the guide groove. Particularly preferably, the cutting strand and the guide unit form a closed system. The term "closed system" is here intended to define, in particular, a system comprising at least two components, which, by means of an interaction, in a disassembled state of the system, of a system, such as a machine tool, superordinate to the aforementioned system, maintain a functionality, and/or which, in the disassembled state, are captively connected to each other. Preferably, the at least two components of the closed system are connected to each other such that they are substantially non-releasable for an operator. By "at least substantially non-releasable" should here be understood, in particular, a connection of at least two components, which can be separated from one another only with the aid of parting tools, such as, for instance, a saw, in particular a mechanical saw, etc., and/or chemical parting agents, such as, for instance, solvents etc.

The expression "movably mounted" is here intended to define, in particular, a mounting of a unit and/or of an element relative to at least one further unit and/or one further element, wherein the unit and/or the element, in particular decoupled from an elastic deformation of the unit and/or of the element and decoupled from freedoms of movement conditionally created by a bearing clearance, has a freedom of movement along at least one axis along a section greater than 1 mm, preferably greater than 10 mm, and particularly preferably greater than 20 mm, and/or a freedom of movement about at least one axis through an angle greater than 10°, preferably greater than 45°, and particularly preferably greater than 60°. The cutting strand contact guard element is preferably movably mounted on an outer face of the guide unit. Moreover, the cutting strand contact guard element is preferably configured as the cutting edge of a cutting strand and/or guide unit, which cutting edge protects an operator from accidental contact with the cutting strand. Preferably, the cutting strand contact guard element, by covering the cutting strand and/or the guide unit, prevents accidental contact with the cutting strand. Particularly preferably, the cutting strand contact guard element here prevents accidental contact with the cutting strand in an operating position, in particular a cutting strand protection position, of the cutting strand contact guard element, in which position the cutting strand contact guard element covers the cutting strand or, with at least one face, projects beyond the cutting strand. Particularly preferably, the cutting strand contact guard element, when applied to a workpiece for machining of the workpiece, is moved by means of the power cutting tool into a cutting strand freeing position of the cutting strand contact guard element. In the cutting strand freeing position, the cutting strand contact guard element at least partially frees the cutting strand for machining of a workpiece. By means of the disclosed design of the power cutting tool, a risk of injury to an operator of the power cutting tool can advantageously be kept low. Safe handling of the power cutting tool can thus advantageously be achieved.

It is further proposed that the cutting strand contact guard element is rotatably mounted on the guide unit. As a result, a pivot movement of the cutting strand contact guard element out of a cutting strand protection position into a cutting strand freeing position can be realized particularly advantageously.

Thus an automatic swing-away of the cutting strand contact guard element when the power cutting tool is applied to a workpiece for machining of the workpiece by means of the power cutting tool can advantageously be achieved. Moreover, a pivotable mounting can be configured in a constructively simple manner so as to be resistant to dirt.

It is additionally proposed that the cutting strand contact guard element surrounds the guide unit, at least in a subregion of the guide unit, from at least two sides. The cutting strand contact guard element here surrounds the guide unit, viewed in a plane running at least substantially perpendicular to a cutting plane of the cutting strand, preferably on at least two sides. Particularly preferably, the cutting strand contact guard element surrounds the guide unit, at least in a subregion of the guide unit, from at least three sides. The expression "surrounded from three sides" is here intended to define, in particular, an arrangement of the cutting strand contact guard element relative to the guide unit in which two, in particular imaginary, straight lines running at least substantially perpendicular to each other, at least one of which runs at least substantially perpendicular to a side or outer face of the guide unit, respectively intersect the cutting strand contact guard element at least once and the guide unit at least once. Particularly preferably, the cutting strand contact guard element, viewed in the plane running at least substantially perpendicular to a cutting plane of the cutting strand, has on the three sides of the guide unit respectively a greater extent than the guide unit. Thus the cutting strand contact guard element preferably extends, along at least one direction, beyond the guide unit. The term "cutting plane" is here intended to define, in particular, a plane in which the cutting strand, in at least one operating state, is moved for machining of a workpiece. Preferably, the cutting strand is moved in the cutting plane along a periphery of the guide unit in at least two mutually oppositely directed cutting directions relative to the guide unit. Preferably, the cutting plane, in a machining of a workpiece, is oriented at least substantially transversely to a workpiece surface to be machined. By "at least substantially transversely" should be understood, in particular, an orientation of a plane and/or of a direction relative to a further plane and/or a further direction, which orientation preferably differs from a parallel orientation of the plane and/or of the direction relative to the further plane and/or the further direction. It is also conceivable, however, for the cutting plane, in a machining of a workpiece, to be oriented at least substantially parallel to a workpiece surface to be machined, in particular if the cutting strand is configured as an abrasive, etc. By means of the disclosed design, a broad coverage of the cutting strand or of the guide unit by the cutting strand contact guard element can advantageously be achieved.

Advantageously, the cutting strand contact guard element, viewed in a plane running at least substantially perpendicular to a cutting plane of the cutting strand, has a U-shaped cross section. A receiving region of the cutting strand contact guard element, for receiving or for covering the cutting strand and/or the guide unit, can hereby be achieved in a constructively simple manner, in which receiving region the cutting strand and/or the guide unit, at least in the cutting strand protection position, are disposed.

It is also proposed that the cutting strand contact guard unit has at least one spring element, which subjects the cutting strand contact guard element to a spring force. Preferably, the spring element biases the cutting strand contact guard element into a cutting strand protection position of the cutting strand contact guard element. By a "spring element" should be understood, in particular, a macroscopic element which has at least one extent that, in a normal operating state, is elastically variable by at least 10%, in particular by at least 20%, preferably by at least 30%, and particularly advantageously by at least 50%, and which, in particular, generates a counterforce which is dependent on a change in the extent and is preferably proportional to the change and which opposes the change. By an "extent" of an element should be understood, in particular, a maximum distance apart of two points of a perpendicular projection of the element onto a plane. By a "macroscopic element" should be understood, in particular, an element having an extent of at least 1 mm, in particular of at least 5 mm, and preferably of at least 10 mm. The spring element can be configured as a compression spring, as a tension spring, as a torsion spring, etc. Preferably, the spring element is configured as a leg spring or as a helical compression spring. A design as a cup spring, as a volute spring, etc. is likewise conceivable. By means of the disclosed design, a spring-force-based automatic resetting of the cutting strand contact guard element can advantageously be realized.

It is further proposed that the cutting strand contact guard unit has at least one fixing element, which fixes the cutting strand contact guard element in at least one position relative to the guide unit. Preferably, the fixing element is rotatably mounted. It is also conceivable, however, for the fixing element to be mounted in a translationally movable manner. By means of the disclosed design, an accidental movement of the cutting strand contact guard element out of a cutting strand protection position into a cutting strand freeing position can advantageously be prevented.

It is further proposed that the cutting strand contact guard element is mounted in a translationally movable manner on the guide unit. The cutting strand contact guard element is here preferably mounted movably on the guide unit by means of guide rails. It is also conceivable, however, for the cutting strand contact guard element to be mounted in a translationally movable manner on the guide unit by means of other means which appear sensible to a person skilled in the art. A robust mounting of the cutting strand contact guard element can hereby be achieved in a constructively simple manner.

It is also proposed that the cutting strand contact guard element is configured such that it is telescopically extensible. A compact arrangement of the cutting strand contact guard element can advantageously hereby be achieved, in particular in a cutting strand freeing position of the cutting strand contact guard element.

The disclosure is additionally based on a portable machine tool having a coupling device for positive and/or non-positive coupling with a power cutting tool according to the disclosure. By a "portable machine tool" should here be understood, in particular, a machine tool, in particular a hand-operated machine tool, which can be transported without a transport machine by an operator. The portable machine tool has, in particular, a mass which is less than 40 kg, preferably less than 10 kg, and particularly preferably less than 5 kg. Particularly preferably, the power cutting tool according to the disclosure and the portable machine tool according to the disclosure form a machine tool system. Moreover, a portable machine tool which is particularly advantageously suitable for a wide range of use can advantageously be achieved. In addition, safe handling for an operator of the portable machine tool can advantageously be achieved.

The power cutting tool according to the disclosure, the portable machine tool according to the disclosure and/or the machine tool system according to the disclosure is/are not intended to be limited to the application and embodiment described above. In particular, the power cutting tool according to the disclosure, the portable machine tool according to the disclosure and/or the machine tool system according to the disclosure can have, for fulfillment of a functionality described herein, a number which differs from a herein stated number of individual elements, components and units.

BRIEF DESCRIPTION OF THE DRAWINGS

Further advantages emerge from the following drawing description. In the drawing, illustrative embodiments of the disclosure are represented. The drawing, the description and the claims contain numerous features in combination. The person skilled in the art will expediently also view the features individually and combine them into sensible further combinations. In said drawing:

DETAILED DESCRIPTION

Figure 1:
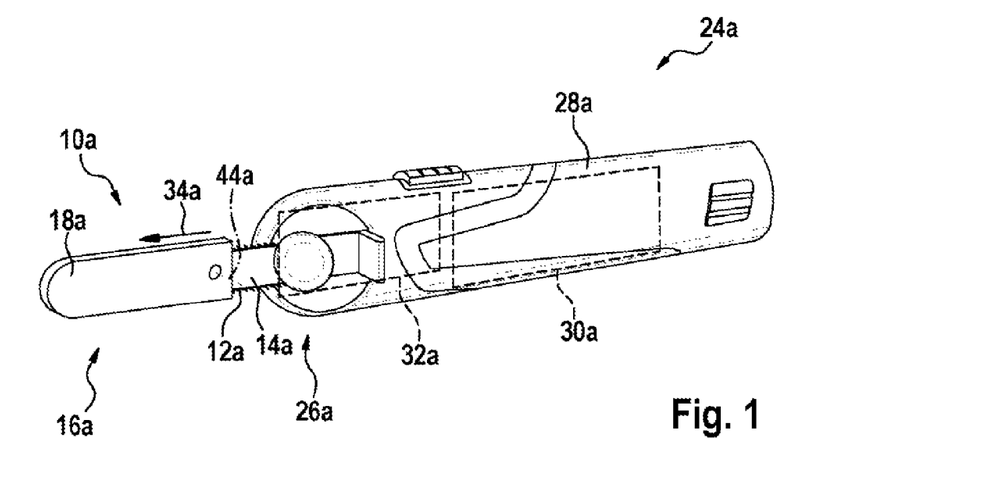
FIG. 1 shows in schematic representation a portable machine tool according to the disclosure having a power cutting tool according to the disclosure.

FIG. 1 shows a portable machine tool 24a having a power cutting tool 10a, which together form a machine tool system. The power cutting tool 10a comprises a cutting strand 12a and at least one guide unit 14a for guiding the cutting strand 12a. The power cutting tool 10a also comprises at least one cutting strand contact guard unit 16a, which has at least one cutting strand contact guard element 18a that is movably mounted on the guide unit 14a and that is designed to at least substantially prevent accidental contact with the cutting strand 12a in at least one operating position of the cutting strand contact guard element 18a. The cutting strand contact guard element 18a is formed of plastic. It is also conceivable, however, for the cutting strand contact guard element 18a to be formed of a metallic material or of a different material which appears sensible to a person skilled in the art.

The portable machine tool 24a has a coupling device 26a for positive and/or non-positive coupling of the power cutting tool 10a. The coupling device 26a can here be configured as a bayonet fastening and/or as a different coupling device which appears sensible to a person skilled in the art. In addition, the portable machine tool 24a has a machine tool housing 28a, which encloses a drive unit 30a and a gear unit 32a of the portable machine tool 24a. For the generation of a drive torque transmissible to the power cutting tool 10a, the drive unit 30a and the gear unit 32a are operatively connected to each other in a manner which is already known to a person skilled in the art. The gear unit 32a is configured as an angular gear. The drive unit 30a is configured as an electric motor unit. It is also conceivable, however, for the drive unit 30a and/or the gear unit 32a to have a different design which appears sensible to the person skilled in the art. The drive unit 30a is designed to drive the cutting strand 12a of the power cutting tool 10a, in at least one operating state, via the gear unit 32a. The cutting strand 12a in the guide unit 14a of the power cutting tool 10a is here moved along a cutting direction 34a of the cutting strand 12a in the guide unit 14a.

Figure 2:
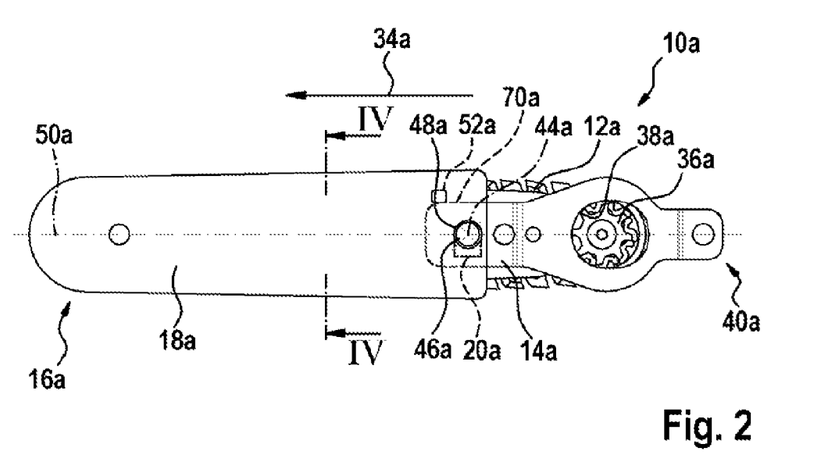
FIG. 2 shows in schematic representation a detailed view of the power cutting tool according to the disclosure having a cutting strand contact guard unit located in a cutting strand protection position.

FIG. 2 shows the power cutting tool 10a in a state decoupled from the coupling device 26a of the portable machine tool 24a. The power cutting tool 10a has the cutting strand 12a and the guide unit 14a, which together form a closed system. The cutting strand 12a is guided by means of the guide unit 14a. To this end, the guide unit 14a has at least one guide element (not represented in detail here), which is configured as a guide groove and by means of which the cutting strand 12a is guided. The cutting strand 12a is here guided by means of marginal regions of the guide unit 14a, which marginal regions limit the guide groove. It is also conceivable, however, for the guide element to be configured in a different way which appears sensible to a person skilled in the art, such as, for instance, as a rib-like molding on the guide unit 14a, which engages in a recess on the cutting strand 12a. The cutting strand 12a further comprises a multiplicity of mutually connected cutting strand segments, which together form the cutting strand 12a configured as a cutting chain.

For the driving of the cutting strand 12a, the power cutting tool 10a or the portable machine tool 24a has a torque transmission element 36a, which, for the transmission of forces and/or of torques to the cutting strand 12a, is connectable to the drive unit 30a and/or the gear unit 32a. In a design of the portable machine tool 24a comprising the torque transmission element (not represented in detail), the torque transmission element, during a coupling of the power cutting tool 10a and the coupling device 26a, is connected to the cutting strand 12a. In a design of the power cutting tool 10a comprising the torque transmission element 36a, the torque transmission element 36a and the cutting strand 12a itself, after decoupling from the coupling device 26a, are engaged. For a coupling of the torque transmission element 36a, configured with the power cutting tool 10a, and the drive unit 30a and/or the gear unit 32a, the torque transmission element 36a has a coupling recess (not represented in detail here), in which a pinion (not represented in detail here) of the drive unit 30a, and/or a gearwheel (not represented in detail here), and/or a splined shaft (not represented in detail here) of the gear unit 32a, in an assembled state, engages. The coupling recess is arranged concentrically in the torque transmission element 36a. The torque transmission element 36a is further configured as a gearwheel. The torque transmission element 36a is mounted at least partially in the guide unit 14a. The torque transmission element 36a, viewed along a direction perpendicular to the cutting plane, is here disposed at least partially between outer faces of the guide unit 14a in a recess 38a of the guide unit 14a. In addition, the torque transmission element 36a is rotatably mounted about a rotational axis in the guide unit 14a, which rotational axis runs at least substantially perpendicular to the outer faces of the guide unit 14a or to the cutting plane of the cutting strand 12a.

Figure 4:
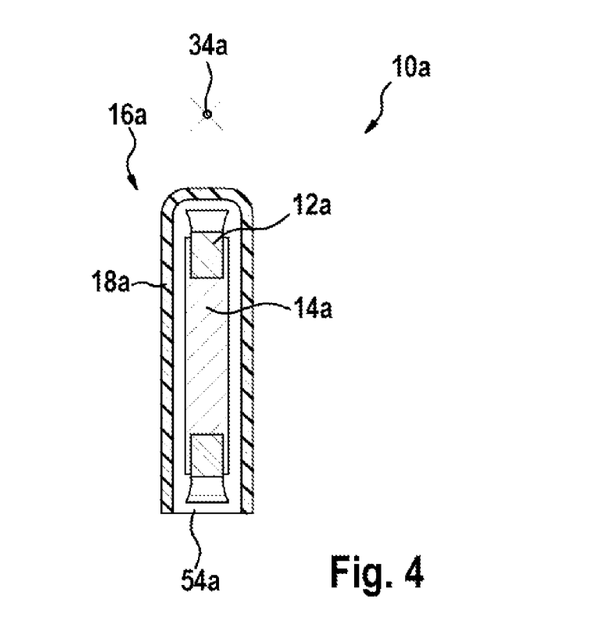
FIG. 4 shows in schematic representation a sectional view of the power cutting tool according to the disclosure having the cutting strand contact guard unit located in a cutting strand protection position.

The cutting strand contact guard element 18a is represented in FIG. 2 in a cutting strand protection position. The cutting strand contact guard element 18a here surrounds the guide unit 14a, at least in a subregion of the guide unit 14a, from at least two sides. The cutting strand contact guard element 18a preferably surrounds the guide unit 14a in a subregion of the guide unit 14a from at least three sides. To this end, the cutting strand contact guard element 18a, viewed in a plane running at least substantially perpendicular to a cutting plane of the cutting strand 12a, has a U-shaped cross section (FIG. 4). The cutting strand contact guard element 18a is rotatably mounted on the guide unit 14a. The cutting strand contact guard element 18a here has a rotational axis 44a which runs at least substantially perpendicular to the outer faces of the guide unit 14a or to the cutting plane of the cutting strand 12a. The cutting strand contact guard element 18a is also rotatably mounted on the guide unit 14a in the region of a drive side 40a of the guide unit 14a. The torque transmission element 36a of the power cutting tool 10a is likewise rotatably mounted on the guide unit 14a in the region of the drive side 40a. In a coupling of the power cutting tool 10a and the coupling device 26a, the drive side 40a of the guide unit 14a is coupled with the coupling device 26a or introduced into the coupling device 26a.

Figure 3:
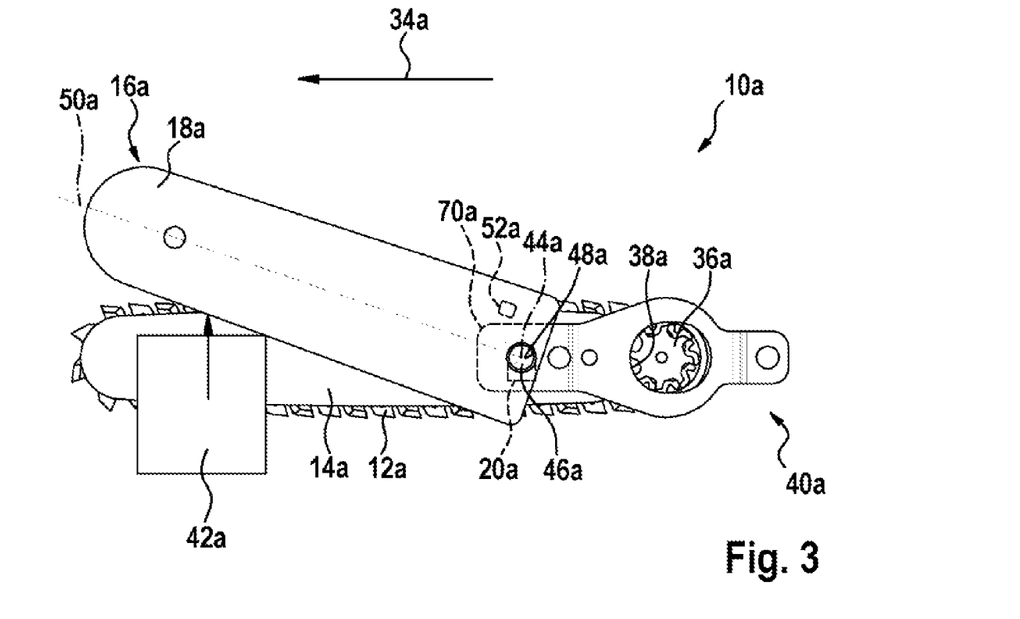
FIG. 3 shows in schematic representation a detailed view of the power cutting tool according to the disclosure having the cutting strand contact guard unit located in a cutting strand freeing position.

In a machining of a workpiece 42a (FIG. 3), the cutting strand contact guard element 18a, starting from a cutting strand protection position, is pivoted by an operator into a cutting strand freeing position. As a result of an application of the cutting strand contact guard element 18a to the workpiece 42a and a further force effect in the direction of the workpiece 42a to be machined, the cutting strand contact guard element 18a, starting from the cutting strand protection position, can be moved into the cutting strand freeing position. It is also conceivable, however, for an operator to move the cutting strand contact guard element 18a manually from the cutting strand protection position into the cutting strand freeing position. The cutting strand contact guard unit 16a further has at least one spring element 20a, which subjects the cutting strand contact guard element 18a to a spring force. The spring element 20a biases the cutting strand contact guard element 18a in the direction of the cutting strand protection position of the cutting strand contact guard element 18a. The spring element 20a is here supported with one end against the cutting strand contact guard element 18a, and the spring element 20a is supported with a further end against the guide unit 14a. It can thus be ensured that the cutting strand contact guard element 18a, as a result of a movement of the power cutting tool 10a which is directed away from the workpiece 42a to be machined, is moved by the spring force of the spring element 20a securely into the cutting strand protection position. The spring element 20a is here disposed in the region of a bearing element 46a of the cutting strand contact guard unit 16a. The spring element 20a can here be configured as a leg spring, as a helical spring, etc.

The bearing element 46a of the cutting strand contact guard unit 16a is configured as a bearing bolt. Moreover, the bearing element 46a is designed to mount the cutting strand contact guard element 18a pivotably on the guide unit 14a. The bearing element 46a here engages at least in a bearing recess 48a of the cutting strand contact guard element 18a and in a bearing recess (not represented in detail) of the guide unit 14a. It is also conceivable, however, for the bearing element 46a to have a different design which appears sensible to a person skilled in the art, such as, for instance, a design as a hinge, as a ball joint, etc. The bearing element 46a is disposed on a center axis 50a of the cutting strand contact guard element 18a. The cutting strand contact guard element 18a is configured symmetrically to the center axis 50a. The bearing element 46a is also disposed in a region of the drive side 40a of the guide unit 14a. To enable a movement of the cutting strand contact guard element 18a relative to the guide unit 14a and relative to the cutting strand 12a, the cutting strand contact guard element 18a has a lead-through recess 54a (FIG. 4).

The cutting strand contact guard unit 16a further has a stop element 52a, which is designed to limit at least one length of movement of the cutting strand contact guard element 18a, starting from the cutting strand freeing position into the cutting strand protection position. The stop element 52a is configured in one piece with the cutting strand contact guard element 18a. Moreover, the stop element 52a, in order to limit the length of movement of the cutting strand contact guard element 18a, cooperates with a counter stop element 70a of the guide unit 14a. It is also conceivable for the stop element 52a to be designed, furthermore, to limit a length of movement of the cutting strand contact guard element 18a, starting from the cutting strand protection position, into the cutting strand freeing position.

In FIGS. 5 to 8, alternative illustrative embodiments are represented. Substantially constant components, features and functions are fundamentally numbered with the same reference symbols. In order to differentiate between the illustrative embodiments, the letters a to e are added to the reference symbols of the illustrative embodiments. The following description is substantially confined to the differences from the first illustrative embodiment in FIGS. 1 to 4, wherein, with respect to constant components, features and functions, reference can be made to the description of the first illustrative embodiment in FIGS. 1 to 4.

Figure 5:
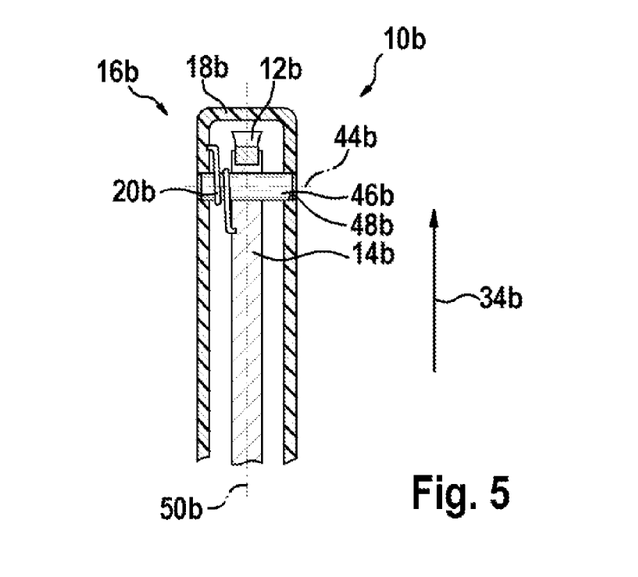
FIG. 5 shows in schematic representation a detailed view of an alternative power cutting tool according to the disclosure having a cutting strand contact guard unit located in a cutting strand protection position.

FIG. 5 shows an alternative power cutting tool 10b.

The power cutting tool 10b comprises at least one cutting strand 12b and at least one guide unit 14b for guiding the cutting strand 12b. The cutting strand 12b and the guide unit 14b together form a closed system. The power cutting tool 10b also comprises at least one cutting strand contact guard unit 16b, which has at least one cutting strand contact guard element 18b that is movably mounted on the guide unit 14b and that is designed to substantially prevent accidental contact with the cutting strand 12b in at least one operating position of the cutting strand contact guard element 18b. The cutting strand contact guard element 18b is here rotatably mounted on the guide unit 14b. To this end, the cutting strand contact guard unit 16b has a bearing element 46b, which is configured as a bearing bolt. The bearing element 46b is disposed in the region of a side of the guide unit 14b, which side is facing away from a drive side 40b of the guide unit 14b. In addition, the bearing element 46b extends at least substantially perpendicular to the outer faces of the guide unit 14b. With respect to further features of the power cutting tool 10*b*, reference can be made to the power cutting tool 10*a* described in FIGS. 1 to 4.

Figure 6:
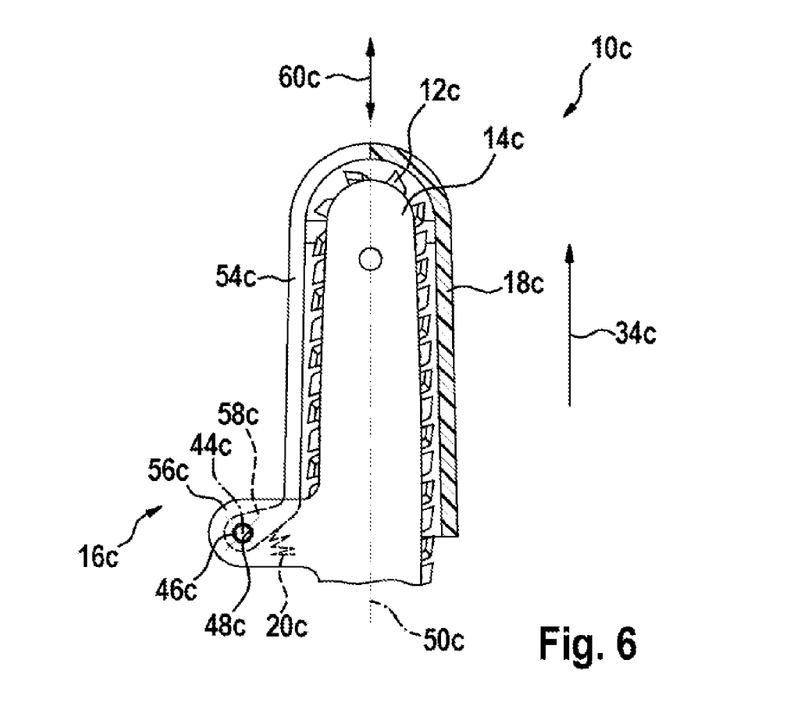
FIG. 6 shows in schematic representation a detailed view of a further, alternative power cutting tool according to the disclosure having a cutting strand contact guard unit located in a cutting strand protection position.

FIG. 6 shows a further, alternative power cutting tool 10*c*. The power cutting tool 10*c* comprises at least one cutting strand 12*c* and at least one guide unit 14*c* for guiding the cutting strand 12*c*. The cutting strand 12*c* and the guide unit 14*c* together form a closed system. The power cutting tool 10*c* also comprises at least one cutting strand contact guard unit 16*c*, which has at least one cutting strand contact guard element 18*c* that is movably mounted on the guide unit 14*c* and that is designed to at least substantially prevent accidental contact with the cutting strand 12*c* in at least one operating position of the cutting strand contact guard element 18*c*. The cutting strand contact guard element 18*c* is here rotatably mounted on the guide unit 14*c*. To this end, the guide unit 14*c* has a transverse continuation 56*c*, on which a bearing element 46*c* of the cutting strand contact guard unit 16*c* is disposed. The transverse continuation 56*c* extends at least substantially parallel to outer faces of the guide unit 14*c* and at least substantially perpendicular to a direction of principal extent 60*c* of the guide unit 14*c*. The bearing element 46*c* is configured as a bearing bolt and engages in a bearing recess 48*c* of the cutting strand contact guard element 18*c*, and the bearing recess 48*c* is disposed on a bearing continuation 58*c* of the cutting strand contact guard element 18*c*. The bearing continuation 58*c* is here disposed outside a center axis 50*c* of the cutting strand contact guard element 18*c*. The bearing element 46*c* is thus likewise disposed outside the center axis 50*c*. With respect to further features of the power cutting tool 10*c*, reference can be made to the power cutting tool 10*a* described in FIGS. 1 to 4.

Figure 7:
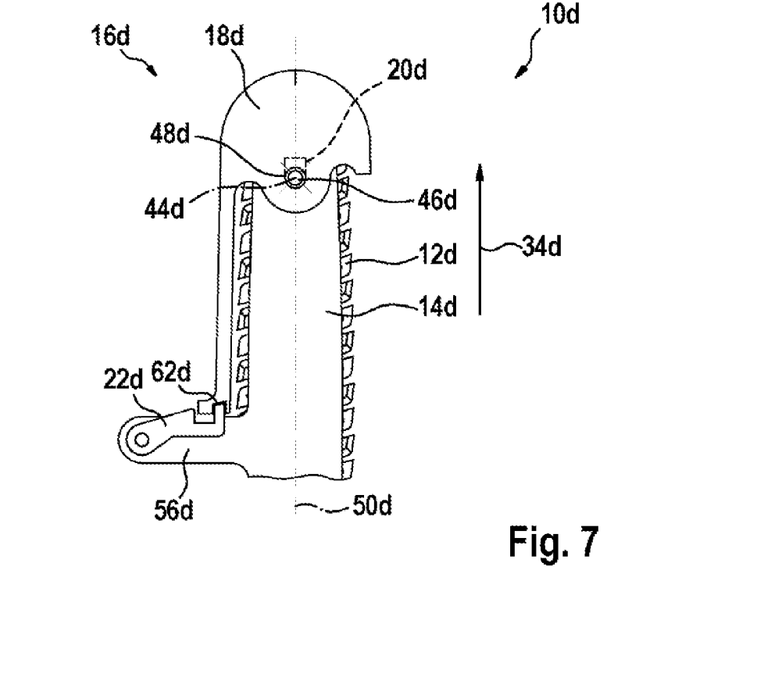
FIG. 7 shows in schematic representation a detailed view of a further, alternative power cutting tool according to the disclosure having a cutting strand contact guard unit located in a cutting strand protection position.

FIG. 7 shows a further, alternative power cutting tool 10*d*. The power cutting tool 10*d* comprises at least one cutting strand 12*d* and at least one guide unit 14*d* for guiding the cutting strand 12*d*. The cutting strand 12*d* and the guide unit 14*d* together form a closed system. The power cutting tool 10*d* also comprises at least one cutting strand contact guard unit 16*d*, which has at least one cutting strand contact guard element 18*d* that is movably mounted on the guide unit 14*d* and that is designed to at least substantially prevent accidental contact with the cutting strand 12*d* in at least one operating position of the cutting strand contact guard element 18*d*. The cutting strand contact guard element 18*d* is here rotatably mounted on the guide unit 14*d*. To this end, the cutting strand contact guard unit 16*d* has a bearing element 46*d*, which is configured as a bearing bolt. The bearing element 46*d* is disposed in the region of a side of the guide unit 14*d*, which side is facing away from a drive side 40*d* of the guide unit 14*d*. In addition, the bearing element 46*d* extends at least substantially perpendicular to the outer faces of the guide unit 14*d*.

Furthermore, the cutting strand contact guard unit 16*d* has at least one fixing element 22*d*, which fixes the cutting strand contact guard element 18*d* in at least one position relative to the guide unit 14*d*. The fixing element 22*d* is here designed to fix the cutting strand contact guard element 18*d* in a cutting strand protection position. The fixing element 22*d* is pivotably disposed on a transverse continuation 56*d* of the guide unit 14*d*. It is also conceivable, however, for the fixing element 22*d* to be disposed at a different position which appears sensible to a person skilled in the art. The fixing element 22*d* is also configured as a latching hook, which is designed to cooperate with a latching recess 62*d* of the cutting strand contact guard element 18*d*. The latching recess is configured in one piece with the cutting strand contact guard element 18*d* for fixing of the cutting strand contact guard element 18*d* in the cutting strand protection position. It is also conceivable, however, for the fixing element 22*d* to be configured as a spring-loaded overlatching element, which is mounted in a translationally movable manner on the guide unit 14*d*. With respect to further features of the power cutting tool 10*d*, reference can be made to the power cutting tool 10*a* described in FIGS. 1 to 4.

Figure 8:
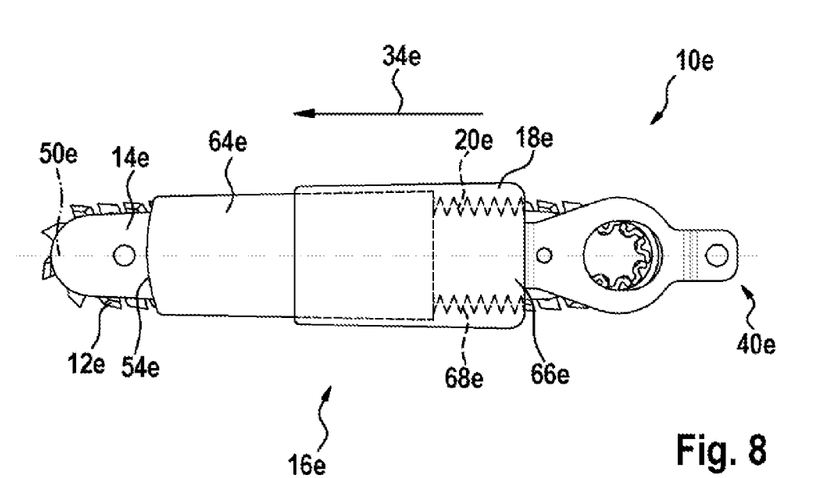
FIG. 8 shows in schematic representation a detailed view of a further, alternative power cutting tool according to the disclosure having a cutting strand contact guard unit.

FIG. 8 shows a further, alternative power cutting tool 10*e*. The power cutting tool 10*e* comprises at least one cutting strand 12*e* and at least one guide unit 14*e* for guiding the cutting strand 12*e*. The cutting strand 12*e* and the guide unit 14*e* together form a closed system. The power cutting tool 10*e* is here configured decoupled from a torque transmission element. The power cutting tool 10*e* also comprises at least one cutting strand contact guard unit 16*e*, which has at least one cutting strand contact guard element 18*e* that is movably mounted on the guide unit 14*e* and that is designed to at least substantially prevent accidental contact with the cutting strand 12*e* in at least one operating position of the cutting strand contact guard element 18*e*. The cutting strand contact guard element 18*e* is here mounted in a translationally movable manner on the guide unit 14*e*. The cutting strand contact guard element 18*e* is here configured such that it is telescopically extensible. The cutting strand contact guard element 18*e* comprises at least two telescopic cutting strand contact guard element subregions 64*e*, 66*e*. It is also conceivable, however, for the cutting strand contact guard element 18*e* to have a number of cutting strand contact guard element subregions 64*e*, 66*e* which differs from two. One of the cutting strand contact guard element subregions 64*e*, 66*e* is mounted in a translationally displaceable manner in the other of the cutting strand contact guard element subregions 64*e*, 66*e*. The cutting strand contact guard unit 16*e* also comprises at least two spring elements 20*e*, 68*e*, which subject at least one of the cutting strand contact guard element subregions 64*e*, 66*e* of the cutting strand contact guard element 18*e* to a spring force. The spring elements 20*e*, 68*e* are here configured as helical compression springs. The spring elements 20*e*, 68*e* are disposed between the cutting strand contact guard element subregions 64*e*, 66*e*. Thus the spring elements 20*e*, 68*e* are respectively supported with one end against the cutting strand contact guard element subregions 64*e*, 66*e*. The spring elements 20*e*, 68*e* thus form stop elements of the cutting strand contact guard unit 16*e*, which limit a length of movement of the cutting strand contact guard element subregions 64*e*, 66*e* relative to each other. Furthermore, the cutting strand contact guard element subregions 64*e*, 66*e*, viewed in a plane running substantially perpendicular to a cutting plane of the cutting strand 12*e*, have a U-shaped or an O-shaped cross section (not represented in detail here). With respect to further features of the power cutting tool 10*e*, reference can be made to the power cutting tool 10*a* described in FIGS. 1 to 4.

The invention claimed is:

1. A portable machine tool comprising:
   a tool housing;
   a power cutting tool that includes:
   at least one cutting strand;
   at least one guide unit which guides the cutting strand; and
   at least one cutting strand guard unit, which has at least one cutting strand guard element that is movably mounted on the at least one guide unit and that is configured to at least substantially prevent, in at least one operating position of the cutting strand guard element, user contact with the cutting strand; and a coupling device configured to couple the power cutting tool to the tool housing, wherein the cutting strand guard unit has at least one fixing element configured to selectively fix the cutting strand guard element in a fixed position relative to the guide unit, and wherein the at least one fixing element is pivotably disposed on the at least one guide unit.

2. A power cutting tool comprising:

at least one cutting strand;

at least one guide unit which guides the cutting strand; and at least one cutting strand guard unit, which has at least one cutting strand guard element that is movably mounted on the at least one guide unit and that is configured to at least substantially prevent, in at least one operating position of the cutting strand guard element, user contact with the cutting strand, wherein the cutting strand guard unit has at least one fixing element configured to selectively fix the cutting strand guard element in a fixed position relative to the guide unit, and wherein the at least one fixing element is pivotably disposed on the at least one guide unit.

3. The power cutting tool as claimed in claim 2, wherein the cutting strand guard element is rotatably mounted on the guide unit.

4. The power cutting tool as claimed in claim 2, wherein the cutting strand guard element surrounds the guide unit, at least in a subregion of the guide unit, from at least two sides of the guide unit.

5. The power cutting tool as claimed in claim 2, wherein the cutting strand guard element, viewed in a plane running at least substantially perpendicular to a cutting plane of the cutting strand, has a U-shaped cross section.

6. The power cutting tool as claimed in claim 2, wherein the cutting strand guard unit has at least one spring element, which is configured to act on the cutting strand guard element with a spring force.

7. The power cutting tool as claimed in claim 2, wherein the at least one cutting strand and the at least one guide unit form a closed system and are connected so as to be at least substantially non-releasable from one another.

8. The power cutting tool as claimed in claim 2, wherein the at least one fixing element is rotationally movable.

9. The power cutting tool as claimed in claim 2, wherein the cutting strand guard element includes a latching recess, and the at least one fixing element includes a latching hook configured to interact with the latching recess in a locked position so as to fix the cutting strand guard element in the fixed position relative to the guide unit.

\* \* \* \* \*